US007661739B2

(12) United States Patent
Burgmeier

(10) Patent No.: US 7,661,739 B2
(45) Date of Patent: Feb. 16, 2010

(54) GRIPPER FOR CONTAINERS AND CONTAINER HANDLING MACHINE

(75) Inventor: Berthold Burgmeier, Thalmassing (DE)

(73) Assignee: Krones AG, Neutraubling (DE)

( * ) Notice: Subject to any disclaimer, the term of this patent is extended or adjusted under 35 U.S.C. 154(b) by 223 days.

(21) Appl. No.: 11/632,431

(22) PCT Filed: Jul. 12, 2005

(86) PCT No.: PCT/EP2005/007511

§ 371 (c)(1),
(2), (4) Date: Apr. 2, 2007

(87) PCT Pub. No.: WO2006/008023

PCT Pub. Date: Jan. 26, 2006

(65) Prior Publication Data

US 2008/0038099 A1 Feb. 14, 2008

(30) Foreign Application Priority Data

Jul. 15, 2004 (DE) ....................... 10 2004 034 306

(51) Int. Cl.
*B25J 15/08* (2006.01)

(52) U.S. Cl. ....................................... 294/106; 294/116

(58) Field of Classification Search ................. 294/106, 294/110.1, 116; 198/803.7, 803.9
See application file for complete search history.

(56) References Cited

U.S. PATENT DOCUMENTS 3,263,535 A * 8/1966 Zurcher ........................ 81/302
3,295,882 A * 1/1967 Wallberg ...................... 294/88
3,310,335 A * 3/1967 Shuey .......................... 294/88
3,545,804 A * 12/1970 Richner ....................... 294/116
3,866,966 A * 2/1975 Skinner, II .................. 294/106
4,598,942 A * 7/1986 Shum et al. ................. 294/106

(Continued)

FOREIGN PATENT DOCUMENTS

DE 34 34 009 C2 3/1986

(Continued)

*Primary Examiner*—Dean J Kramer
(74) *Attorney, Agent, or Firm*—Marshall, Gerstein & Borun LLP

(57) ABSTRACT

A gripper for containers, in particular for those having at least partially a circular cross section, such as bottles, the gripper having a first, a second and a third swiveling lever which can grip a container in a first, a second and a third position, respectively, whereby the first swiveling lever has an operating arm which is used for operating the gripper and whereby the first swiveling lever is linked to the second swiveling lever and the first swiveling lever is linked to the third swiveling lever and the container can be held by gripping it with the three swiveling levers in the three positions. Additionally provided is a gripper for containers, in particular for bottles, with swiveling levers which can grip the container and can hold it in a closed position, whereby one of the swiveling levers has an operating arm which is prestressed into the closed position with a spring, and the gripper has a cam which is linked to the operating arm with a rod, whereby the cam, the operating arm, the spring and the rod cooperate so that a dead point in the spring force occurs between the opened position and the closed position. Also, provided is a container processing and/or conveying machine having a gripper.

9 Claims, 4 Drawing Sheets

U.S. PATENT DOCUMENTS

| | | | | | |
|---|---|---|---|---|---|
| 4,653,793 | A * | 3/1987 | Guinot et al. | | 294/86.4 |
| 4,828,276 | A * | 5/1989 | Link et al. | | 279/33 |
| 6,079,541 | A * | 6/2000 | Bercelli et al. | | 198/377.03 |
| 6,669,257 | B2 * | 12/2003 | Laliberte et al. | | 294/106 |

FOREIGN PATENT DOCUMENTS

| | | | |
|---|---|---|---|
| DE | 199 03 319 | A1 | 8/1999 |
| EP | 0 486 439 | B1 | 5/1992 |
| EP | 0 659 683 | B1 | 6/1995 |
| SU | 1 093 660 | A | 5/1984 |

* cited by examiner

GRIPPER FOR CONTAINERS AND CONTAINER HANDLING MACHINE

CROSS-REFERENCE TO RELATED APPLICATION

This is the U.S. national stage under 35 U.S.C. §371, of international application no. PCT/EP2005/007511, having an international filing date of Jul. 12, 2005, and claims priority to German application no. 10 2004 034 306.3 filed on Jul. 15, 2004.

FIELD OF THE DISCLOSURE

The disclosure relates to a gripper for containers and a container processing and/or conveying machine.

BACKGROUND OF THE DISCLOSURE

Grippers for containers, e.g., for bottles are used on container processing machines such as bottle processing machines for gripping the containers. In the gripped position, the containers can be processed. This may include applying or removing labels, coating, conveying, filling, sealing and the like.

Especially in handling PET bottles, such grippers are provided for gripping the bottles in their neck area with a collar provided for this purpose.

For example, a gripper with two swiveling levers which are linked for swiveling is known from EP 0 486 439 B1.

One disadvantage of this gripper is that the bottles can apply pressure to the gripper with forces corresponding to those that occur in the transfer of bottles, for example, with movement in the direction of the swiveling axes of the swiveling levers.

In addition, another disadvantage of this gripper is that it is suitable for only one bottle size.

SU 1 093 660 describes a gripper for objects having various diameters. A piston that can be moved back and forth is coupled to swiveling levers so that the piston together with the swiveling levers can stop objects of different sizes by coming to rest at three points, so that the centers of the various objects are always identically positioned.

The design of the piston that can be moved forward and in reverse and the type of coupling to the swiveling levers result in a great mechanical complexity and/or a great play, which leads to inaccuracies in holding the objects.

DE 199 03 319 A1 describes cells which may be of different sizes and can hold the bottles. A container is held at four points in the cell. A swiveling lever is provided for each point, the swiveling levers being linked together in various ways. One of the swiveling levers has an articulated lever which can be controlled by a cam.

Here again, the great mechanical complexity due to the four swiveling levers for the at least four points of contact between the bottle and the levers is a disadvantage. This complexity also results in a considerable play.

SUMMARY OF THE DISCLOSURE

The object of the present disclosure is therefore to create a gripper that is suitable for various container sizes and has the simplest possible design with the smallest possible amount of play. Another object of the present disclosure is to create a container processing machine having corresponding grippers.

The gripper has three swiveling levers which are designed so that it is possible to hold a container by means of the three swiveling levers. This refers in particular to containers having a round cross section in the holding position. A swiveling lever here is equipped with an operating arm with which the gripper can be operated, i.e., opened and closed. The second and third swiveling levers are each linked to the first swiveling lever. On the whole, there is little play due to the fact that the second and third swiveling levers are each linked directly to the first swiveling lever which has the operating arm.

A connection between the swiveling levers by means of gearwheel segment pieces is also advantageous because then no other mechanical elements such as pusher rods or the like are needed and accurate coupling is possible with little or no play.

In addition, a prestressing element for the first swiveling lever is also advantageous, whereby it preferably acts on the operating arm of the first swiveling lever and is preferably also prestressed into the position in which the gripper is closed.

In addition, in an advantageous embodiment, the position in which the third swiveling lever can grip the container is between the container and the swiveling axes, e.g., the swiveling axis of the first swiveling lever, because this prevents slippage of the container in the direction of the swiveling axes. Such slippage may occur in particular as the containers are fed into the grippers and released from them.

An embodiment in which the first and second and possibly also the third swiveling levers have a contoured grip surface with which they can grip a container, so that each swiveling lever grips the container separately in at least two positions is especially advantageous. A variant in which it is possible to grip containers in two different positions for two containers of different sizes is especially advantageous here, so that containers of different sizes with different diameters are always centered in the same location. This is advantageous for filling the containers, for example, so that the filling valve is always arranged centrally above the container opening regardless of the size of the container opening. A variant in which the containers may have diameters between 24 mm and 38 mm is preferable here. By holding the containers in two locations by the first and second swiveling levers and holding by the third swiveling lever, i.e., in a total of five locations, the pressure on the container due to the gripper is distributed uniformly over the circumference, so that excessive deformation of the container is prevented.

Furthermore, in another advantageous embodiment, the actuating arm is linked to a rod via an elongated hole. Through the elongated hole, various positions of the gripper can be compensated in the closed position with diameters of different sizes. The rod is preferably linked to a cam, so that by rotating the cam it is possible to move the rod forward and backward to operate the gripper.

In one embodiment, a gripper for containers is provided, having swiveling levers which can grip the container. One of the swiveling levers has an operating arm which is prestressed with a spring, so that the swiveling levers are prestressed into a closed position. A cam is linked by a rod to the operating arm in such a way that the opened position is beyond a dead point of the spring force starting from the closed position.

In the opened position, the spring thus acts to hold the gripper in the opened position. By acting on the cam, it is then possible to switch back and forth between the opened position and the closed position, so that operation is possible beyond the dead point of the spring force. This link between the various components is designed so that different container sizes are possible. This can be accomplished, for example, by an elongated hole on the operating arm of the rod or the cam.

It is also advantageous to provide a stop for the cam for the opened position and for the closed position so that the cam in the opened position and/or closed position is forced by the spring force against the stop. The cam itself here may be shaped so that it strikes against the stop or a component connected to it. The gripper preferably has three swiveling levers which can grip a container having a round cross section in such a way that the container is held by being gripped in the three positions.

BRIEF DESCRIPTION OF THE DRAWINGS

An embodiment of the disclosed gripper will now be explained on the basis of the figures, in which.

DETAILED DESCRIPTION OF THE DISCLOSURE

Figure 1:
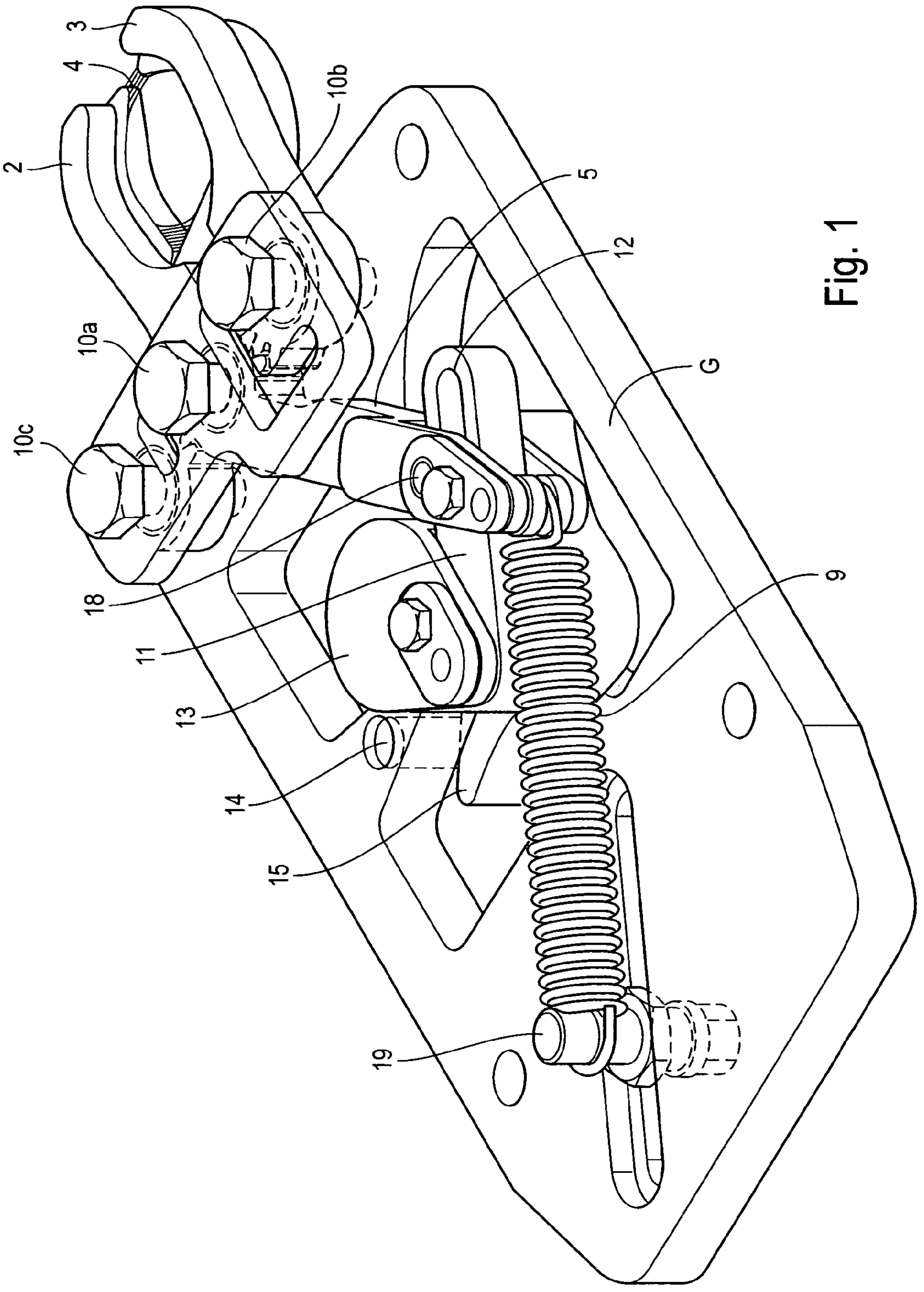
FIG. 1 shows a three-dimensional schematic diagram of the gripper.

FIG. 1 shows a gripper 1 having a base plate G and a first and second swiveling lever 2, 3. The swiveling levers surround a container position on opposite sides. A container for holding may be arranged between the first and second swiveling levers 2, 3. The first and second swiveling levers 2, 3 are linked together by gearwheel segments 8*a*, 8*b* (see FIG. 2) for swiveling. Due to the direct connection of the two swiveling levers 2, 3 to one another, they have only a very minor play or none at all.

Figure 2:
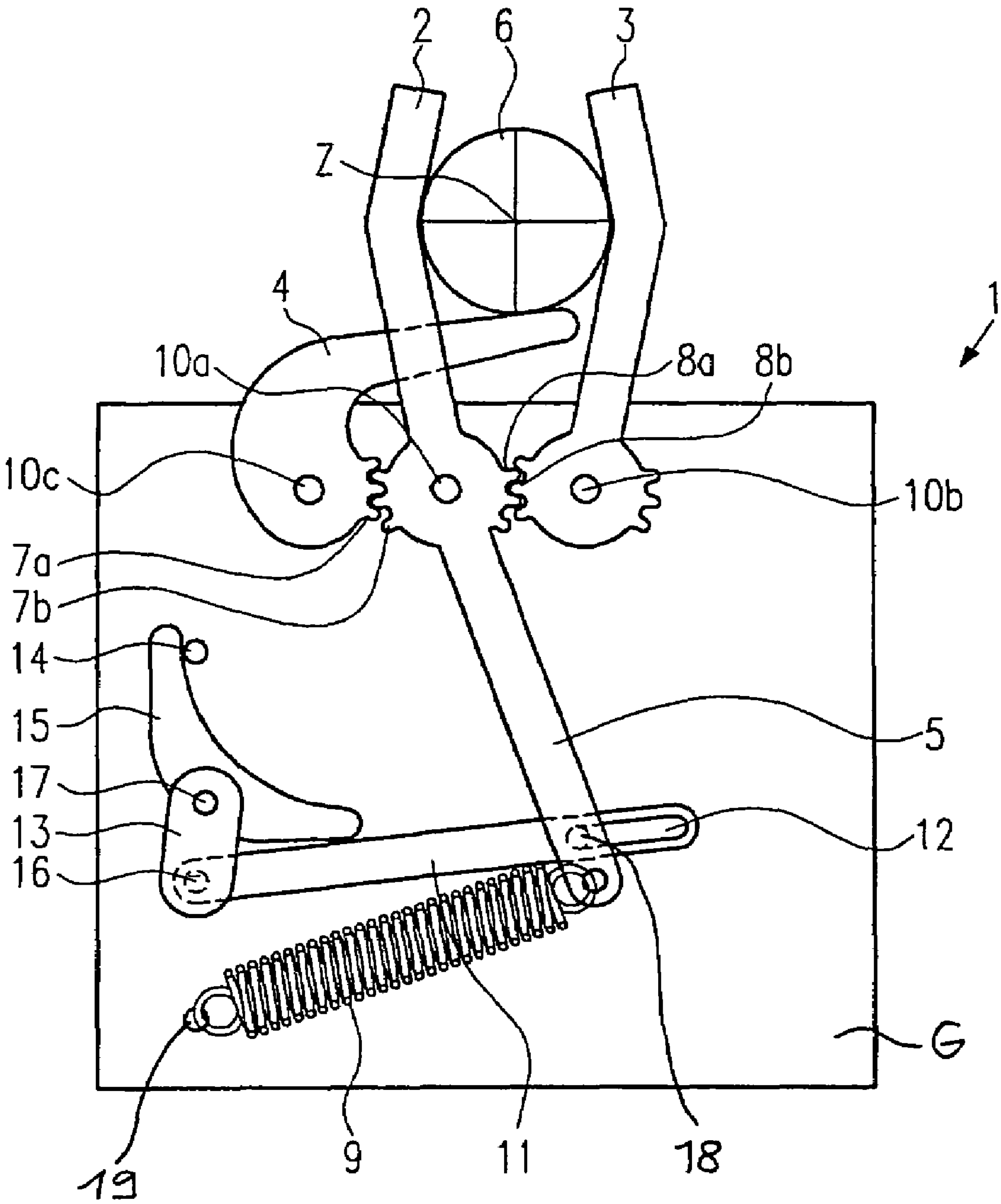
FIG. 2 shows a schematic top view of the gripper in the closed position for a small container.

A third swiveling lever 4 also linked to the first swiveling lever 2 via gearwheel segments 7*a*, 7*b* (see FIG. 2). Here again, the direct link produces the smallest possible play. The third swiveling lever 4 is arranged in such a way that it intersects the first swiveling lever 2. Therefore, the connection between the first and third swiveling levers 2, 4 may be accomplished by the gearwheel segments on the one side of the first swiveling lever 2 that the gripping position of the third swiveling lever 4 on the container is situated on the other side of the first swiveling lever 2.

With the first, second and third swiveling levers 2, 3, 4, the container may be gripped in at least three positions, these three positions being situated so that the container is held and centered at the center Z. The swiveling levers 2, 3, 4 may be swiveled to open the gripper or to close it but also to be able to grip containers of different sizes. The swiveling levers 2, 3, 4 are therefore designed so that they can be swiveled away from the center Z of the container position toward the outside (see FIGS. 2, 3, 4) but can also be swiveled in synchronization toward the center Z of the container position. The swiveling axes of the three swiveling levers 2, 3, 4 are formed here by threaded bolts 10*a*, 10*b*, 10*c*, which are screwed into the base plate G on a straight connecting line.

The first swiveling lever 2 has an operating arm 5. The operating arm 5 is lengthened starting from the axial position of the swiveling axis 10*a* from the first swiveling lever 2. The operating arm 5 is thus on the opposite side of the container position with respect to the connecting line of the three swiveling axes 10*a*, 10*b*, 10*c*. By swiveling the operating arm 5, the three swiveling levers 2, 3, 4 are swiveled in synchronization for opening or closing. At the end of the operating arm 5, it has a fork-shaped opening with which a rod 11 engages. The rod 11 has an elongated hole 12 with which a pin 18 of the operating arm 5 engages so that the rod 11 is movable with respect to the operating arm 5 within the frame of the elongated hole 12.

At the end of the fork-shaped opening of the operating arm 5, a spring 9 has an articulated connection, its other end being attached to a bolt 19 which is attached to the base plate G so that it is adjustable in its position. By adjusting the position of the bolt, the spring force can be varied. The spring 9 pulls on the operating arm 5 so that it prestresses the swiveling levers 2, 3, 4 in the direction of the center Z of the container position.

At the end of the rod 11 which is not linked to the operating arm 5, the rod 11 is rotatably linked to a cam 13 by a joint 16. By rotating the cam 13 mounted in the base plate G, the rod 11 can be moved forward and in reverse and with a sufficiently large movement which is no longer compensated by the elongated hole 12, the operating arm 5 is operated for opening and closing the gripper. By rotating the cam 13, the gripper can thus be opened and closed. In the closed position, the swiveling levers 2, 3, 4 are pressed by the spring 9 against the container to hold it. Because of the elongated hole 12, the spring force is not absorbed by the rod 11. Due to the elongated hole 12 it is also possible to hold containers of different sizes, where the operating arm 5 can assume different positions in relation to the rod 11.

The cam 13 is linked by its axle 17 to a stop member 15 in a rotationally fixed manner. The stop member 15 is provided with two wings which can stop on a stop bolt 14 mounted in the base plate G. For rotating the cam, a force can act on the stop member 15 by means of other machine parts or by hand to thereby operate the gripper.

Figure 3:
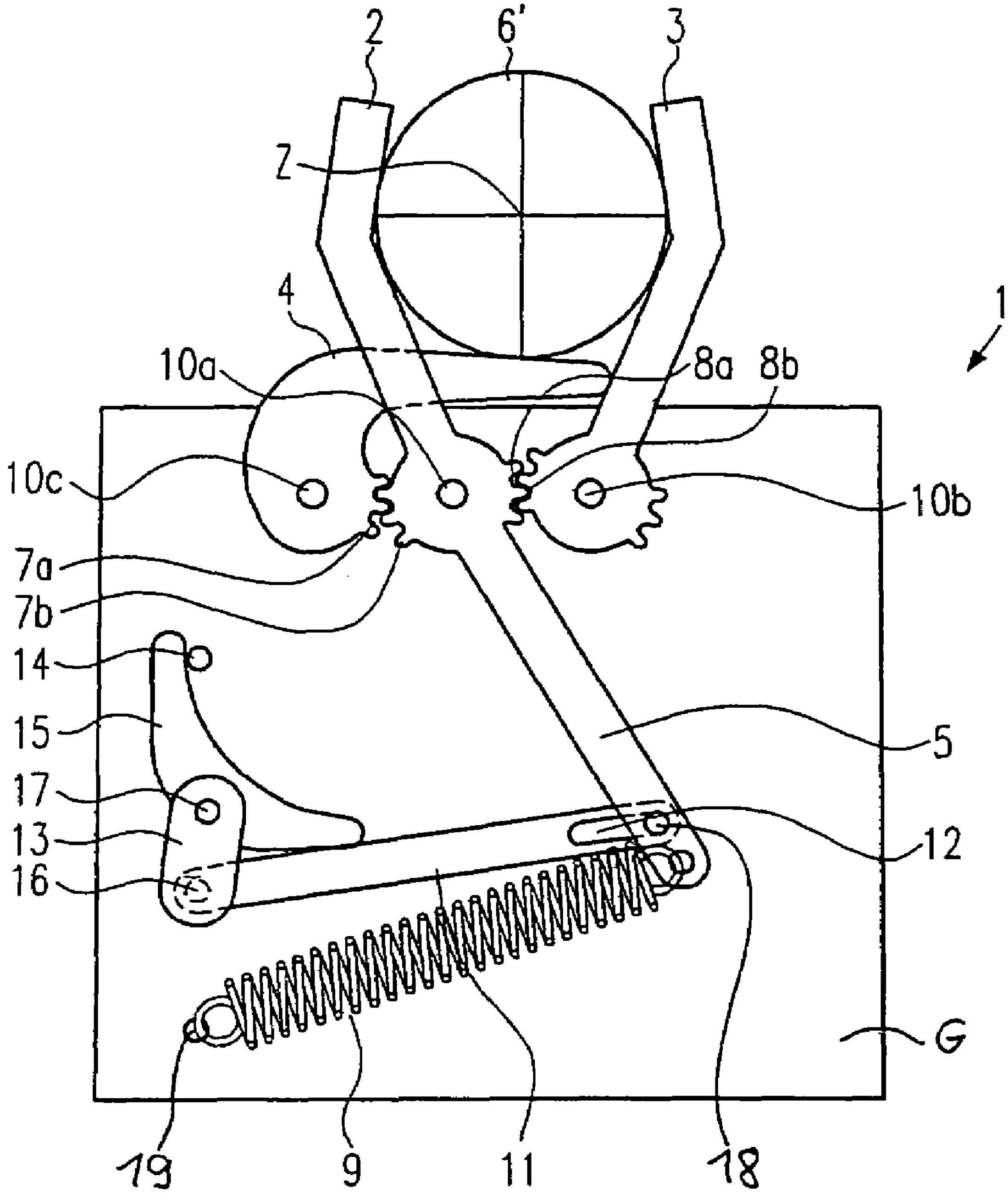
FIG. 3 shows a schematic top view of the gripper in a closed position for a large container.
Figure 4:
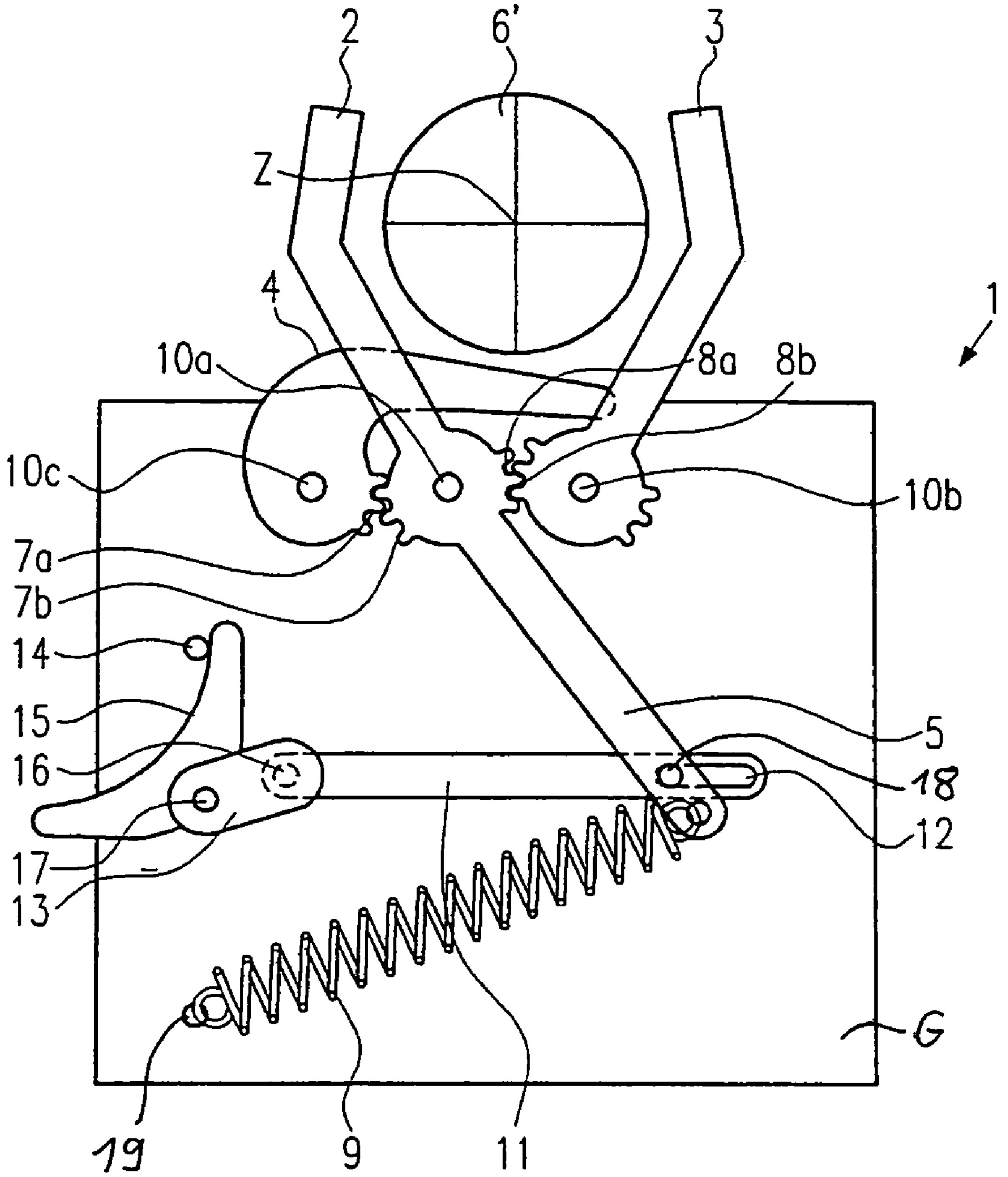
FIG. 4 shows a schematic top view of the gripper in an opened position.

Different states of the gripper are illustrated in FIGS. 2 through 4.

FIG. 2 shows the gripper 1 in a closed position in which a small container 6 is held. The operating arm 5 here is close to the left end of the elongated hole 12 in relation to the elongated hole 12. The stop member 15 is stopped against the stop bolt 14 with a first wing. The cam 13 is designed here as a lever-shaped element which is connected to the stop member 15 in a rotationally fixed manner and is mounted in the base plate together with it by means of a shaft 17.

FIG. 3 shows the stop element 15 with the same first wing in the stop against the stop bolt 14, but the operating arm 5 is close to the right end of the elongated hole 12. In FIG. 3, it is thus possible to hold a larger container 6'. The containers 6 and 6' in FIGS. 2 and 3 are held so that they are arranged with their center Z in the same position in relation to the gripper 1.

In FIG. 4, the gripper is shown in an opened position in which the swiveling levers 2, 3, 4 do not hold the container 6'. The container 6' can be removed from the gripper 1 in a movement upward in FIG. 4 without the swiveling levers 2, 3 interfering with this. As shown in FIG. 4, the stop member 15 has been rotated counterclockwise to the extent that it stops with the second wing against the stop bolt 14. The cam 13 is therefore rotated to the extent that the rod 11 has been pushed to the right as far as possible so that it has also deflected the operating arm 5 toward the right and thus has deflected the first swiveling lever 2 to the left. The spring 9 then pulls the operating arm 5 to the left. Due to the fact that the connecting point 16 between the cam 13 and the rod 11 is situated above a connecting line between the fulcrum 17 of the cam 13 and the connection between the operating arm 5 and the rod 11, therefore the gripper is in a self-locking position which prevents the gripper from being closed by the spring 9. The spring 9 pulls the operating arm 5 to the left, so that the rod 11 is also pushed to the left, which would follow in a rotational movement of the cam 13 counterclockwise but is prevented by the stop 14. The spring 9 in this position thus pulls the cam 13 with the stop member 15 against the stop bolt 14 so that the gripper is held in the opened position. By rotating the stop member 15 clockwise, the gripper can again be brought into a closed position. If the gripper 1 runs on a circular path, this can easily be accomplished by stationary control pins which act on the stop member 15. Instead of a mechanical spring, a pneumatic prestressing element may also be used.

Such grippers may be used with container processing machines such as fillers, labelers, label removers, coaters, sterilizers, etc. or with container conveying machines such as conveyors or transfer stars.

The invention claimed is:

1. Gripper for containers, the containers being bottles having at least a circular cross section, the gripper having swiveling levers being individually pivotally supported on fixed swiveling axes, said swiveling levers being mechanically coupled for simultaneous and synchronous pivot movements about said swiveling axes upon actuation by a cam between a closed position and an opened position of the gripper, at least one of the swiveling levers having an operating arm and the cam being linked to the operating arm by a rod, wherein the gripper has a first, a second, and a third swiveling lever which can grip a container in a first, a second, and a third container cross-section position, respectively, the first swiveling lever having the operating arm that is used for operating the gripper upon actuation by the cam, wherein the first swiveling lever is linked to the second swiveling lever and the first swiveling lever is linked to the third swiveling lever via respective gear wheel segments for swiveling, the container being held in the closed position of the gripper by the respective first, second, and third swiveling levers, gripping the container at the respective first, second, and third container cross-section positions, wherein the first and third swiveling levers intersect each other, wherein the rod is acting on the operating arm via an elongated hole for operation of the gripper, and wherein the rod has an articulated connection to one end of the cam which is rotatable in relation to the rod.

2. Gripper according to claim 1, wherein a prestressing elastic element is acting on the operating arm in closing direction of the gripper towards the closed position of the gripper.

3. Gripper according to claim 2, wherein the cam, the operating arm, the prestressing elastic element and the rod cooperate so that a dead point in the force of the prestressing elastic element occurs between the opened position and the closed position of the gripper.

4. Gripper according to claim 2, wherein the prestressing elastic element is a spring.

5. Gripper according to claim 1, wherein the third container cross-section position at which the third swiveling lever grips the container is between the first and the second container cross-section positions where the first and second swiveling levers are gripping the container.

6. Gripper according to claim 1, wherein the third container cross-section position at which the third swiveling lever grips the container is between the first and second container cross-section positions, where the first and second swiveling levers are gripping the container, and the swiveling axes are the first to third swiveling levers.

7. Gripper according to claim 1, wherein the swiveling axes of the swiveling levers are on a straight line.

8. Gripper according to claim 1, wherein at least one of the first and second swiveling levers has a contoured gripping surface so that the respective first and second swiveling levers grip a container in at least two positions and does so for different container diameters.

9. Gripper according to claim 1, wherein a pin of the operating arm engages into the elongated hole of the rod, so that the rod is movable with respect to the operating arm within the frame of the elongated hole to define different closed positions of the gripper for gripping different container cross-section sizes.

* * * * *